(12) United States Patent
Bang et al.

(10) Patent No.: US 8,004,631 B2
(45) Date of Patent: Aug. 23, 2011

(54) BACKLIGHT UNIT AND LIQUID CRYSTAL DISPLAY DEVICE HAVING THE SAME

(75) Inventors: Ju-Young Bang, Seoul (KR); Myung-Gi Jang, Seoul (KR); Hee-Jeong Park, Gyeonggi-do (KR); Gil-Won Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 324 days.

(21) Appl. No.: 11/476,229

(22) Filed: Jun. 26, 2006

(65) Prior Publication Data

US 2006/0290840 A1 Dec. 28, 2006

(30) Foreign Application Priority Data

Jun. 28, 2005 (KR) ........................ 10-2005-0056582

(51) Int. Cl.
*G02F 1/13357* (2006.01)
*G09F 13/04* (2006.01)

(52) U.S. Cl. ........... 349/62; 349/69; 362/97.1; 362/97.2

(58) Field of Classification Search .......................... None
See application file for complete search history.

(56) References Cited

U.S. PATENT DOCUMENTS

| | | | | |
|---|---|---|---|---|
| 5,639,158 A * | 6/1997 | Sato | ......... | 362/247 |
| 6,527,410 B2 * | 3/2003 | Yamaguchi | ......... | 362/243 |
| 6,871,982 B2 * | 3/2005 | Holman et al. | ......... | 362/331 |
| 7,097,317 B2 * | 8/2006 | Kim | ......... | 362/29 |
| 7,248,330 B2 * | 7/2007 | Ishii et al. | ......... | 349/156 |
| 7,322,721 B2 * | 1/2008 | Noh et al. | ......... | 362/327 |
| 7,324,174 B2 * | 1/2008 | Hafuka et al. | ......... | 349/61 |
| 7,387,399 B2 * | 6/2008 | Noh et al. | ......... | 362/97.1 |
| 7,436,000 B2 * | 10/2008 | Kim et al. | ......... | 257/98 |
| 7,607,800 B2 * | 10/2009 | Park | ......... | 362/240 |
| 2004/0233665 A1 | 11/2004 | West et al. | | |
| 2005/0195341 A1 * | 9/2005 | Koganezawa et al. | ......... | 349/62 |
| 2005/0276068 A1 * | 12/2005 | Chen et al. | ......... | 362/600 |
| 2006/0232864 A1 * | 10/2006 | Tsai | ......... | 359/599 |
| 2007/0002590 A1 * | 1/2007 | Jang et al. | ......... | 362/633 |

FOREIGN PATENT DOCUMENTS

| | | |
|---|---|---|
| CN | 1564067 A | 1/2005 |
| JP | 2000-216437 | 8/2000 |
| JP | 2002-98958 | 4/2002 |
| JP | 2004-311353 A | 11/2004 |
| JP | 2005-44661 A | 2/2005 |

OTHER PUBLICATIONS

*LED backlight for large area LCD TV's*, Robert Scott West et al., IDW 2003 Fukuoka.
Search Report dated Oct. 13, 2006 for corresponding British Patent Application 0612646.0.
Second Office Action issued in corresponding Chinese Patent Application No. 2006100907315; issued Apr. 18, 2008.

(Continued)

*Primary Examiner* — Michelle R Connelly Cushwa
(74) *Attorney, Agent, or Firm* — Brinks Hofer Gilson & Lione (57) ABSTRACT

A backlight unit for a liquid crystal display (LCD) device includes a light emitting device (LED) array portion having a plurality of LEDs and a diverter sheet disposed on the LED array portion and having continuous reflection surface in spaced relationship with to the LED array portion.

12 Claims, 6 Drawing Sheets

OTHER PUBLICATIONS

Notification of the First Office Action for corresponding Chinese Patent Application Serial No. 2006100907315, dated Sep. 7, 2007.

Office Action issued in corresponding Japanese Patent Application No. 2006-177808; mailed Jul. 15, 2009.

* cited by examiner

BACKLIGHT UNIT AND LIQUID CRYSTAL DISPLAY DEVICE HAVING THE SAME

PRIORITY CLAIM

This application claims priority to Korean Patent Application P05-056582, filed Jun. 28, 2005, the disclosure of which is incorporated by reference herein.

TECHNICAL FIELD

The present invention relates, generally, to a backlight unit and a liquid crystal display (LCD) device having the same and, more particularly, to a backlight unit capable of enhancing the optical efficiency by omitting a light guide plate and an LCD device having the same.

BACKGROUND

LCD devices are among a group of flat panel display devices that have been developed and are being widely used in notebook computers, monitors, televisions, spacecrafts, aircrafts, and the like.

The major components of an LCD device are generally described as an LCD panel, a driving circuit unit, and a backlight unit. The LCD panel includes a thin film transistor (TFT) array substrate, a color filter substrate attached to the TFT-array substrate and spaced apart by a predetermined distance, and a liquid crystal layer formed therebetween. A polarizer is attached to an outer portion of each of the two substrates.

The driving circuit unit includes individual circuit devices on a printed circuit board (PCB), and related components.

The backlight unit includes a light emitting lamp, several optical sheets, a supporting mold, and related components.

In an LCD device, the LCD panel displays an image by controlling the amount of light passing therethrough, and the driving circuit unit applies several signals transmitted from the system to the LCD panel to thereby to control the signals. The backlight unit serves as a light emitting unit for evenly irradiating light to the LCD panel. However, it is inefficient to use a backlight unit having a large thickness, weight, and power consumption. Therefore, development work is continuing to provide an improved backlight unit that solves these problems.

An LCD panel can not be used in a place having no light due to a non-spontaneity thereof. In order to solve this problem, backlight units that uniformly irradiate light onto a surface to be displayed have been developed. The backlight unit serving as a light source of the LCD device has to emit light having a high intensity of illumination with minimum power consumption. Also, the backlight unit converts linear fluorescent light into planar light by irradiating light to every surface of the LCD device with the same brightness.

Backlight units can be generally categorized as a direct type, a side type, or an edge type depending on the position of a light emitting lamp. In the direct type backlight unit, light is irradiated from a rear surface of an LCD panel to a front surface of the LCD panel. In the side type backlight unit, light is irradiated from a side surface of a light guide plate and transmitted to the front surface of the LCD device via the light guide plate. In the edge type backlight unit, light is irradiated from one side surface of an inclined light guide plate and transmitted to the front surface of the LCD device via the inclined light guide plate.

The side type backlight unit includes a light emitting lamp for emitting light, a lamp cover for covering the light emitting lamp, a reflection sheet for reflecting light transmitted to a rear surface of an LCD panel into a light guide plate, a light guide plate for scattering light at surfaces of small glass beads included in dots formed at a lower surface of the light guide plate and passing the scattered light, a diffusion sheet for preventing the dot patterns printed on the light guide plate from being directly introduced into an operator's eyes, a prism sheet for focusing light that has passed through the diffusion sheet and thus having a drastically decreased brightness, and then for increasing the brightness of the light, a protection sheet for preventing the LCD device from an external impact or foreign materials, and a mold frame for supporting the components.

The side type backlight unit that emits light to the entire surface of the LCD panel using a light guide plate has a low brightness since the light emitting lamp is installed at an outer surface of the light guide plate and light passes through the light guide plate. The light guide plate is required to have a high optical design and good processing techniques to obtain a uniform brightness.

The direct type backlight unit is mainly applied to an LCD device having a large screen and high brightness. Recently, a direct type backlight unit having a light emitting device (LED) as an optical source has been developed. A conventional direct type backlight unit having a light emitting device (LED) as an optical source will be explained with reference to FIGS. 1 and 2.

Figure 1:
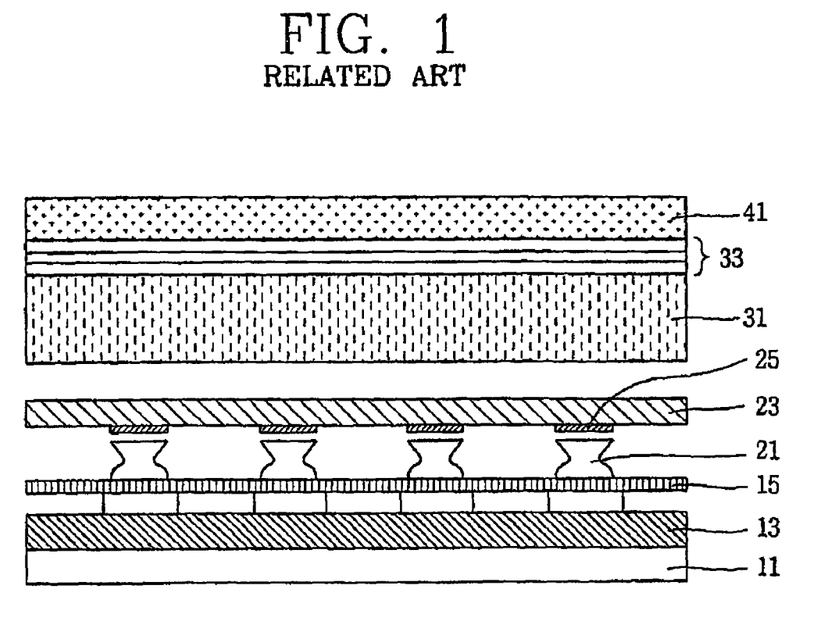
FIG. 1 is a schematic view illustrating a backlight unit for an LCD device in accordance with the conventional art.
Figure 2:
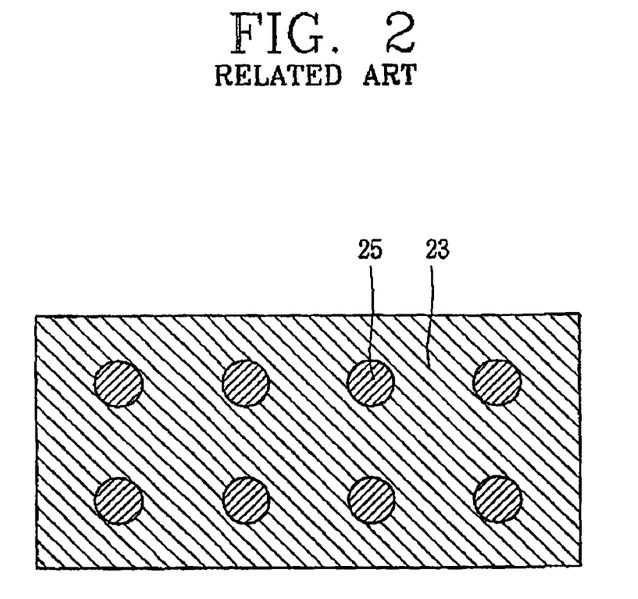
FIG. 2 is a plane view illustrating a rear surface of a light guide plate to which a diverter is attached at a portion corresponding to a light emitting device in the backlight unit for an LCD of FIG. 1.

FIG. 1 is a schematic view illustrating a backlight unit for an LCD device in accordance with the conventional art, and FIG. 2 is a plane view illustrating a rear surface of a light guide plate to which a diverter is attached at a portion corresponding to a light emitting device in the backlight unit for an LCD of FIG. 1.

Referring to FIG. 1, an LED array portion having a plurality of light emitting devices (LED) 21 with a certain gap distance is fixedly installed on an array supporter 13, and the array supporter 13 is coupled to a lower cover 11. A reflection sheet 15 formed of aluminum is provided between the light emitting devices 21. In a backlight unit using a light emitting device sensitive to heat, a metal core printed circuit board (MCPCB) is used as the array supporter 13 for heat emission, which differs from a backlight unit using a cold cathode fluorescent lamp (CCFL) and external electrode fluorescent lamps (EEFL).

A light guide plate 23 is arranged above the LED array portion. Also, as shown in FIG. 2, a plurality of circular diverter 25, formed of a reflective material or having a prism structure, are attached to a rear surface of the light guide plate 23 at positions corresponding to the plurality of LEDs 21. The diverter 25 is used to prevent light emission in a vertical direction and in order to implement color mixing. When power is applied to the LED, an optical beam corresponding to approximately 20% of the total is emitted from the LED in a vertical direction and an optical beam corresponding to approximately 80% of the total is emitted from the LED in a horizontal direction. Accordingly, the diverter 25 guides the optical beam emitted in a vertical direction into a horizontal direction.

A diffusion plate 31 and a plurality of optical sheets 33 are arranged on the light guide plate 23, and an LCD panel 41 is arranged on the plural optical sheets 33.

In the conventional backlight unit, as power is applied to the plural LEDs 21, light is emitted from the LEDs 21 in a horizontal direction and in a vertical direction. The light emitted in a vertical direction is reflected by the diverter 25 and guided into a horizontal direction. As the result, light is uniformly distributed on the entire surface of the backlight unit.

In the conventional backlight unit for an LCD device, an LED used in a direct type backlight unit is a high power side type LED, and light emitted from the LED passes in a lateral direction rather than in a vertical direction. When light emitted in a vertical direction is not shielded, a spot is generated and thus the display quality of the LCD device is degraded. In order to solve this problem, a light guide plate having a printed diverter is used in the conventional art. However, since the conventional diverter does not completely shield light emitted in a vertical direction, a display level is more degraded than in an LCD device using another optical source. Furthermore, since an additional sheet such as a light guide plate is required, a fabrication cost is increased and a mass productivity is lowered. Also, since the diverter has to be attached to the light guide plate in a number proportional to the number of the LEDs, the installation is complicated and the installation cost is increased.

SUMMARY

To achieve these and other advantages and in accordance with the purpose of the present invention as embodied and broadly described herein, there is provided a liquid crystal display (LCD) device including a backlight unit, the device comprising: a light emitting device (LED) array portion having a plurality of LEDs; and a diverter adjacent to the LED array portion and having a continuous reflection surface in spaced relationship with the LED array portion.

The diverter is spaced apart from the LED array portion by a separation distance of about 0 to about 10 mm.

The diverter comprises an integral continuous reflection surface in juxtaposition with the plurality of LEDs.

The diverter comprises an integral continuous reflection surface in spaced relationship with the LED array portion.

The diverter comprises an elongated reflection surface attached to a light guide plate.

The diverter further comprises a supporter at a side surface thereof.

The diverter comprises a partition wall extending from the LED array portion to the diverter.

The partition wall comprises an array defining a plurality of cells in which a number of LEDs are positioned in each cell.

The diverter is supported by the partition wall.

The backlight unit comprises a diffusion plate and an optical plate overlying the diverter.

According to another aspect of the invention, a backlight unit comprises a light emitting device (LED) array portion having a plurality of LEDs; and a diverter disposed over the LED array portion and having a continuous reflection surface comprising linearly arranged circular regions, each circular region at a position corresponding to an LED.

The diverter is spaced apart from the LED array portion by a separation distance of about 0 to about 10 mm.

The each LED has a light discharging portion, and wherein a diameter of the circular regions is equal to or greater than the light discharging portion of the LEDs.

The continuous reflection surface comprises a continuous integral surface of the diverter.

The backlight unit further comprises a plurality of pin-shaped supporters extending from the diverter to the LED array portion.

The backlight unit further comprises a partition wall extending from the LED array portion to the diverter.

The partition wall comprises an array defining a plurality of cells in which a number of LEDs are positioned in each cell.

The diverter is supported by the partition wall.

According to yet another aspect of the invention, a backlight unit comprises a light emitting device (LED) array portion having a plurality of LEDs; and a diverter disposed over the LED array portion and having a continuous linear reflection surface.

The continuous reflection surface comprises a continuous integral surface of the diverter.

The backlight unit further comprises a plurality of pin-shaped supporters extending from the diverter to the LED array portion.

The backlight unit further comprises a partition wall extending from the LED array portion to the diverter.

The partition wall comprises an array defining a plurality of cells in which a number of LEDs are positioned in each cell.

The diverter is supported by the partition wall.

The diverter is spaced apart from the LED array portion by a separation distance of about 0.01 to about 10 mm.

The backlight unit further comprises a light guide plate overlying the diverter.

According to yet another aspect of the invention, a liquid crystal display (LCD) device having a backlight unit, the device comprises an LCD panel; and a backlight unit disposed adjacent to the LCD panel, wherein the backlight unit comprises: a light emitting device (LED) array portion having a plurality of LEDs; and a diverter disposed on the LED array portion and having a continuous reflection surface in spaced relationship with the LED array portion. The continuous reflection surface comprises an integral surface in juxtaposition with the LEDs.

The diverter comprises linearly arranged circular regions, each circular region at a position corresponding to an LED.

The diverter is spaced apart from the LED array portion by a separation distance of about 0.01 to about 10 mm.

The each LED has a light discharging portion, and wherein a diameter of the circular regions is equal to or greater than the light discharging portion of the LEDs.

The LCD device further comprises a partition wall extending from the LED array portion to the diverter.

The partition wall comprises an array defining a plurality of cells in which a number of LEDs are positioned in each cell.

The diverter is supported by the partition wall.

The diverter comprises a continuous linear reflection surface disposed over the LED array portion.

The diverter is spaced apart from the LED array portion by a separation distance of about 0.01 to about 10 mm.

The diverter comprises an integral continuous reflection surface in spaced relationship with the LED array portion.

The diverter is spaced apart from the LED array portion by a separation distance of about 0.01 to about 10 mm.

The LCD device further comprises a partition wall extending from the LED array portion to the diverter.

The partition wall comprises an array defining a plurality of cells in which a number of LEDs are positioned in each cell.

The diverter is supported by the partition wall.

BRIEF DESCRIPTION OF THE DRAWINGS

FIGS. 5A to 5D illustrate a backlight unit for an LCD device according to another embodiment of the invention, in which

FIGS. 6A to 6C illustrate a backlight unit for an LCD device according to still another embodiment of the present invention, in which

DETAILED DESCRIPTION

Reference will now be made in detail to the preferred embodiments of the present invention, examples of which are illustrated in the accompanying drawings.

Hereinafter, a backlight unit and a liquid crystal display (LCD) device having the same according to the present invention will be explained in more detail with reference to the attached drawings.

Figure 3:
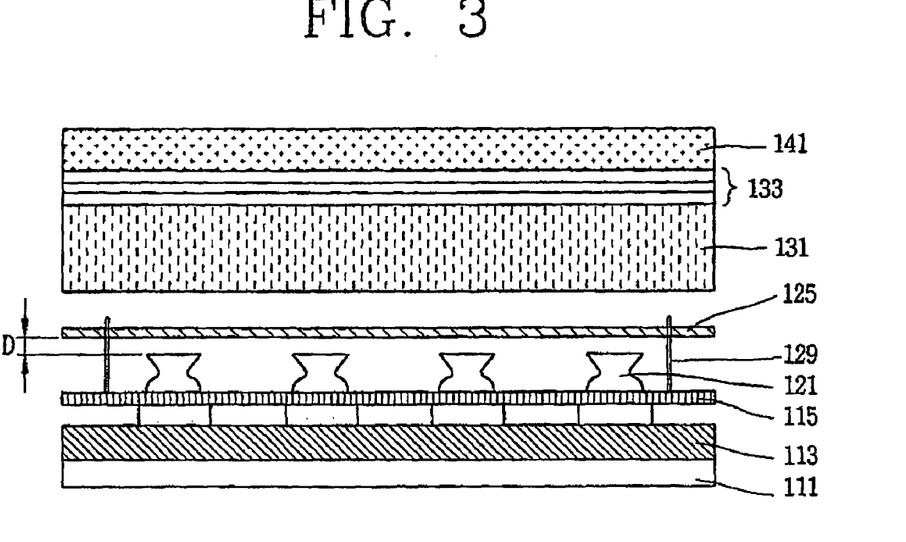
FIG. 3 is a schematic sectional view illustrating a backlight unit for an LCD device according to an embodiment of the invention.
Figure 4A:
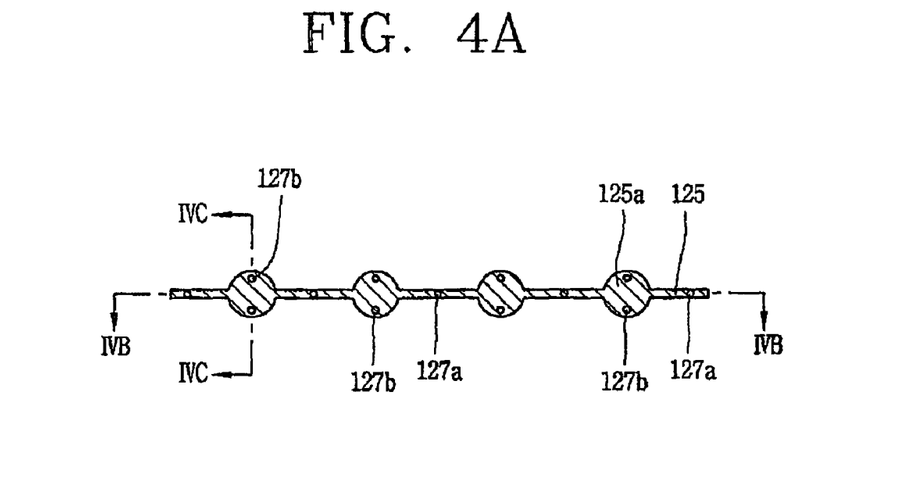
FIG. 4A is a plane view illustrating an integral-type diverter in the backlight unit for an LCD device according to a first embodiment of the invention.
Figure 4B:
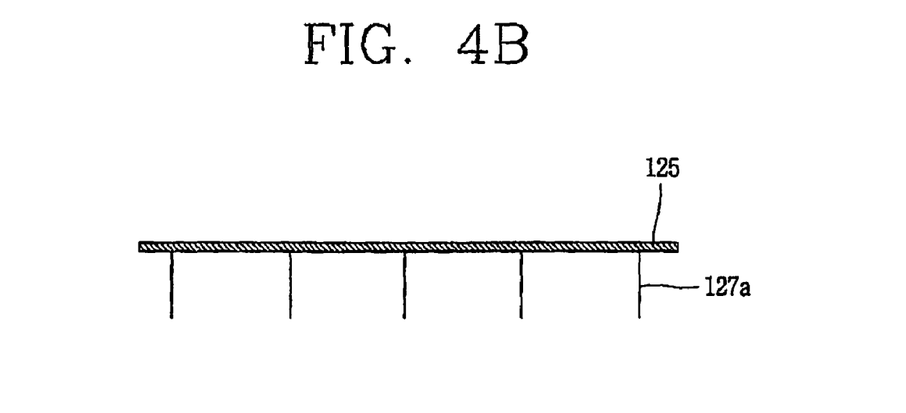
FIG. 4B is a sectional view taken along section line IVB-IVB of FIG. 4A, illustrating the integral-type diverter of FIG. 4A in the backlight unit for an LCD device according to the first embodiment of the invention.
Figure 4C:
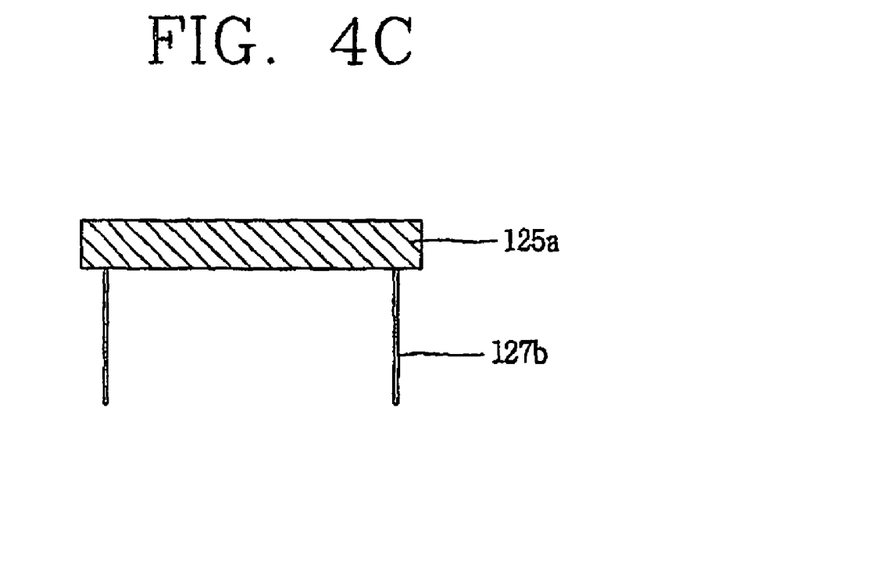
FIG. 4C is a sectional view taken along section line IVC-IVC of FIG. 4A, illustrating the intergral-type diverter of of FIG. 4A in the backlight unit for an LCD device according to the first embodiment of the invention.
Figure 4D:
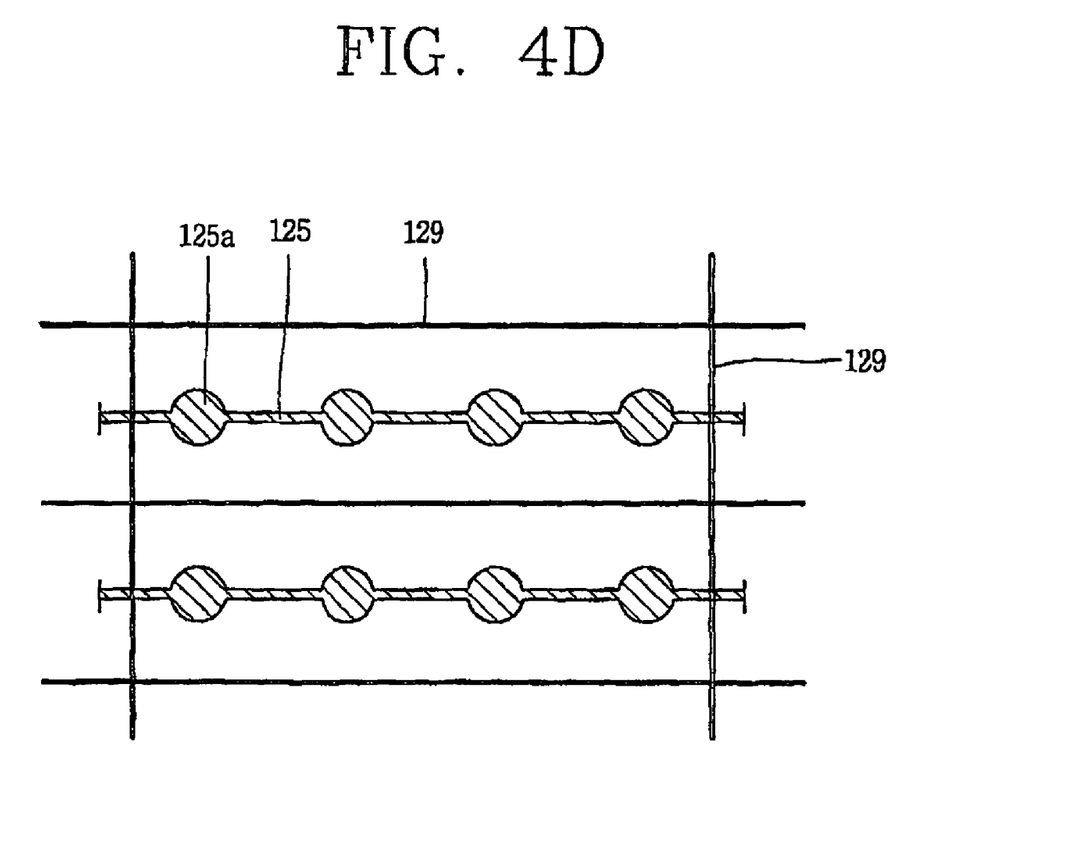
FIG. 4D, is a view showing a structure of connecting the diverter to the partition wall of backlight unit for an LCD device according to the first embodiment of the invention.

FIG. 3 is a schematic view illustrating a backlight unit for an LCD device according to an embodiment of the invention, FIG. 4A is a plane view illustrating an integral-type diverter in the backlight unit for an LCD device according to a first embodiment of the present invention, and FIG. 4B is a sectional view illustrating the integral-type diverter in the backlight unit for an LCD device according to a first embodiment of the present invention. FIG. 4C is a sectional view taken along section line IVC-IVC of FIG. 4A, illustrating the intergral-type diverter of of FIG. 4A in the backlight unit for an LCD device according to the first embodiment of the invention; and FIG. 4D, is a view showing a structure of connecting the diverter to the partition wall of backlight unit for an LCD device according to the first embodiment of the invention;

Referring to FIG. 3, in the backlight unit for an LCD device according to a first embodiment of the present invention, an LED array portion having a plurality of light emitting devices (LED) 121 with a certain gap is fixedly installed at an array supporter 113, and the array supporter 113 is coupled to a lower cover 111. A reflection sheet 115 formed of aluminum is provided between the light emitting devices 121. In a backlight unit using a light emitting device sensitive to heat, a metal core printed circuit board (MCPCB) is used as the array supporter 113 for heat emission differently from a backlight unit using a cold cathode fluorescent lamp (CCFL) and an external electrode fluorescent lamps (EEFL).

As shown in FIGS. 4A to 4C, an integral-type diverter 125 is arranged above the LED array portion having a plurality of LEDs 121 with a certain gap. The integral-type diverter 125 is provided with reflection surfaces 125a having a prism structure or formed of a reflective material at positions corresponding to the plural LEDs 121. A diverter supporter 127a may be installed between the adjacent reflection surfaces 125a in order to prevent the integral-type diverter 125 from being transformed. As shown in FIG. 4D, a partition wall 129 may be installed in the middle of the LED array portion, and the integral-type diverter may be installed in the middle of the partition wall 129 in order to more stably support the integral-type diverter. The diverter 125 comprises an integral continuous reflection surface in juxtaposition with the plurality of LEDs. The diverter 125 comprises an integral continuous reflection surface in spaced relationship with the LED array portion.

The diverter 125 is spaced apart from the LED array portion by a separation distance of about 0.01 to about 10 mm. Each LED has a light discharging portion, and wherein a diameter of the circular region of reflection surface 125a of the diverter 125 is equal to or greater than the light discharging portion of the LEDs. A plurality of pin shaped supporters extending from the diverter to the LED array portion.

In the illustrated structure, the conventional transparent light guide plate is not required and thus avoids the associated transmissivity loss. Further, the optical efficiency is increased compared to the conventional structure.

The reflective surface 125a of the integral-type diverter 125 has a diameter equal or larger than the diameter of the LED 121. In accordance with the illustrated embodiment, the diverter 125 and the reflective surface 125a are a single body. The integral-type diverter 125 is used in order to prevent light emission in a vertical direction and to implement color mixing. The reflective surface 125a of the integral-type diverter 125 guides an optical beam emitted in a vertical direction into a horizontal direction. As shown in FIG. 4D. The diverter 125 comprises an elongated reflection surface attached to a light guide plate. The diverter 125 comprises a supporter 127b at a side surface thereof. The diverter 125 comprises a partition wall 129 extending form the LED array portion to the diverter 125. The partition wall 129 comprises an array defining a plurality of cells in which a number of LEDs are positioned in each cell. The diverter 125 is supported by the partition wall 129.

A diffusion plate 131 and a plurality of optical sheets 133 are arranged on the integral-type diverter 125, and an LCD panel 141 is arranged on the plural optical sheets 133.

In the backlight unit, as power is applied to the plural LEDs 121, light is emitted from the LEDs 121 in a horizontal direction and in a vertical direction. The light emitted in a vertical direction is reflected by the reflective surface 125a of the integral-type diverter 125 thus to be guided into a horizontal direction. As a result, light is uniformly distributed on the entire surface of the backlight unit.

Figure 5A:
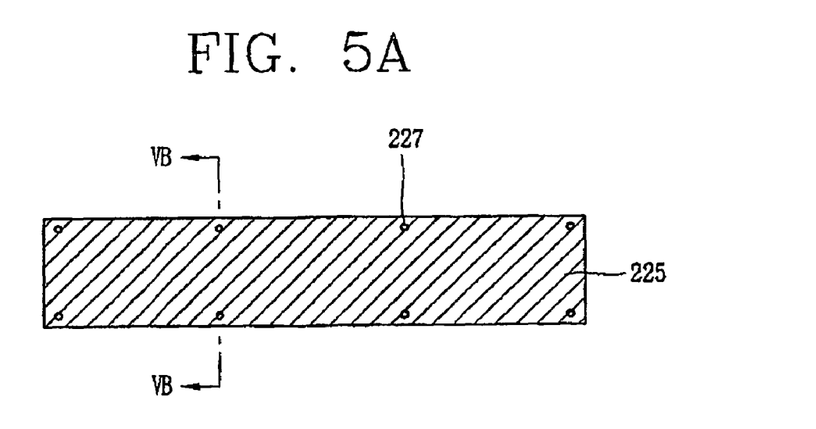
FIG. 5A is a plane view illustrating an integral-type diverter disposed at a position corresponding to an LED array portion.
Figure 5B:
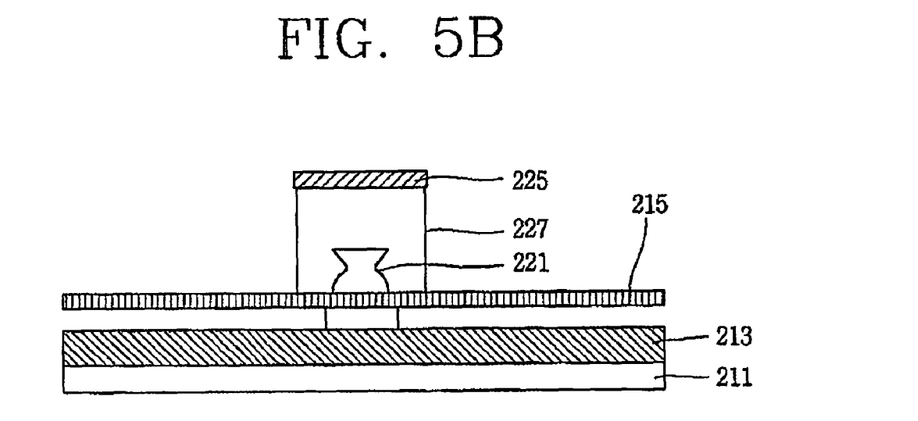
FIG. 5B is a frontal view illustrating the integral-type diverter disposed at a position corresponding to an LED array portion.
Figure 5C:
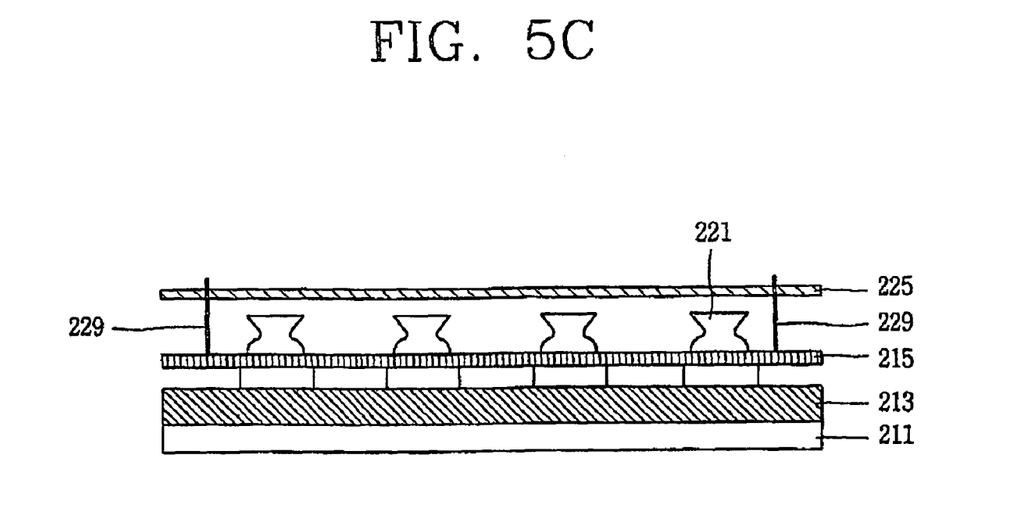
FIG. 5C is a sectional view illustrating the integral-type diverter disposed at a position corresponding to an LED array portion.
Figure 5D:
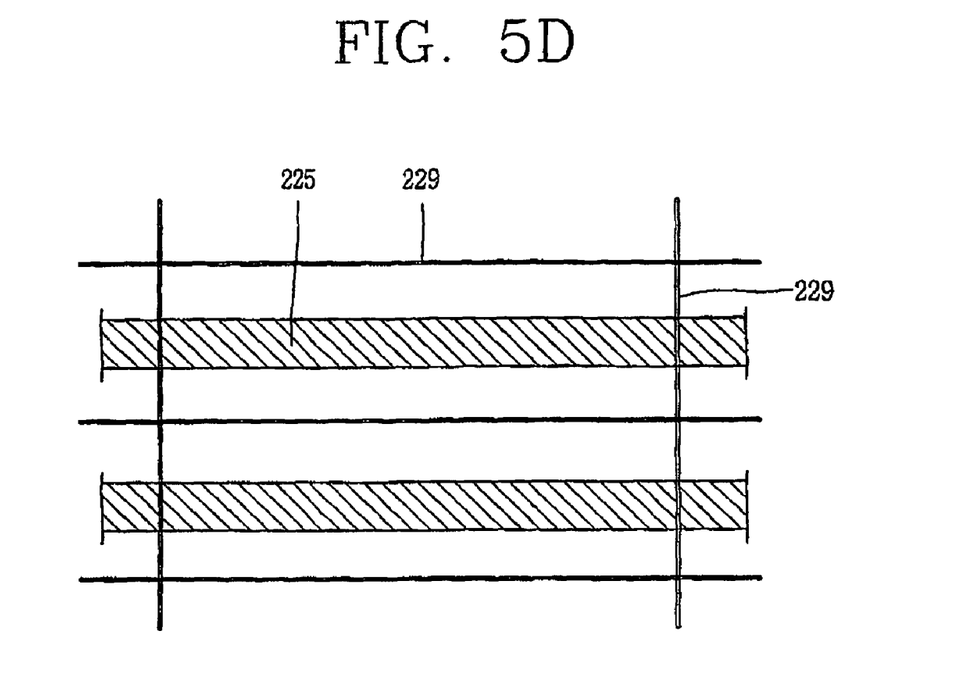
FIG. 5D, is a view showing a structure of connecting the diverter to the partition wall of backlight unit for an LCD device according to the another embodiment of the present invention.

A backlight unit for an LCD device according to another embodiment of the present invention will be explained with reference to FIGS. 5A to 5D. FIG. 5A is a plane view illustrating an integral-type diverter disposed at a position corresponding to an LED array portion, FIG. 5B is a frontal view illustrating the integral-type diverter disposed at a position corresponding to an LED array portion, and FIG. 5C is a sectional view illustrating the integral-type diverter disposed at a position corresponding to an LED array portion. FIG. 5D, is a view showing a structure of connecting the diverter to the partition wall of backlight unit for an LCD device according to the another embodiment of the present invention.

Referring to FIGS. 5A to 5C, in the backlight unit for an LCD device according to another embodiment of the present invention, an LED array portion having a plurality of light emitting devices (LED) 221 with a certain gap is fixedly installed at an array supporter 215, and the array supporter 215 is coupled to a lower cover (not shown). A reflection sheet (not shown) formed of aluminum is provided between the LEDs 221. Because a backlight unit using a light emitting device is sensitive heat, a metal core printed circuit board (MCPCB) is used as the array supporter for heat emission, which differs from a backlight unit using a cold cathode fluorescent lamp (CCFL) and external electrode fluorescent lamps (EEFL).

A straight-line type diverter 225 is formed above the LED array portion having the plural LEDs 221 in correspondence with the entire LED array portion. As shown in FIGS. 5B and 5C, a diverter supporter 227 may be installed at a side surface of the straight-line type diverter 225 in order to prevent the straight-line type diverter 225 from being transformed downwardly. As shown in FIG. 5D, a partition wall 229 may be installed in the middle of the LED array portion, and the straight-line type diverter may be installed in the middle of the partition wall 229 in order to more stably support the straight-line type diverter.

In the illustrated structure, a conventional transparent light guide plate is not required and thus avoids the associated transmissivity loss. Further, the optical efficiency is increased compared to the conventional structure.

A diffusion plate (not shown) and a plurality of optical sheets (not shown) are arranged on the straight-line type diverter 225, and an LCD panel (not shown) is arranged on the plural optical sheets (not shown).

A backlight unit for an LCD device according to still another embodiment of the present invention will be explained with reference to FIGS. 6A to 6C.

Figure 6A:
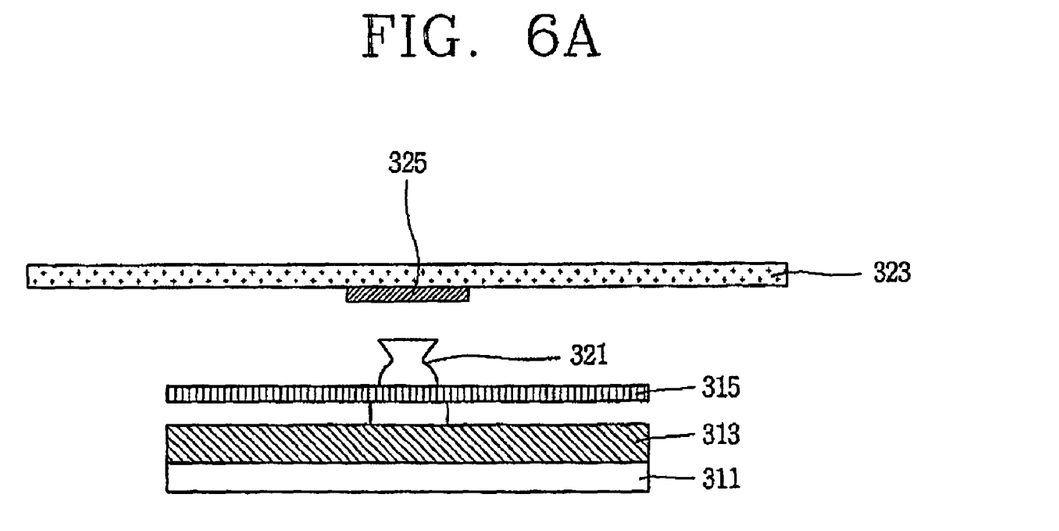
FIG. 6A is a schematic view illustrating an LED array portion and a light guide plate to which a straight-line type diverter is attached at a position corresponding to the LED array portion.
Figure 6B:
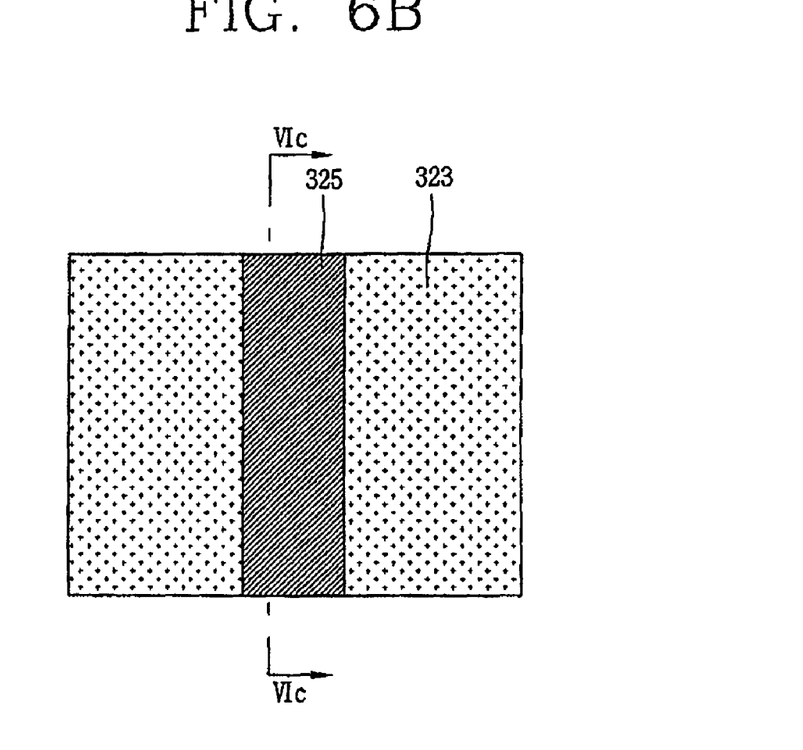
FIG. 6B is a plane view illustrating the LED array portion and the light guide plate to which a straight-line type diverter is attached at a position corresponding to the LED array portion.
Figure 6C:
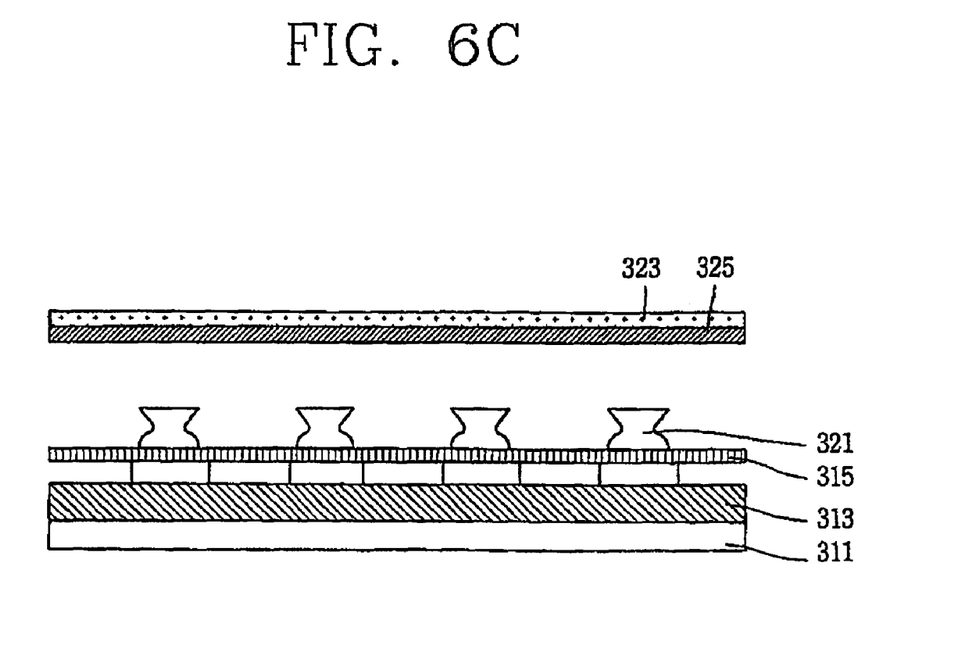
FIG. 6C is a sectional view taken along section line VI-VI of FIG. 6B, illustrating the LED array portion and a light guide plate to which a straight-line type diverter is attached at a position corresponding to the LED array portion.

FIG. 6A is a schematic view illustrating an LED array portion and a light guide plate to which a straight-line type diverter is attached at a position corresponding to the LED array portion, FIG. 6B is a plane view illustrating the LED array portion and the light guide plate to which a straight-line type diverter is attached at a position corresponding to the LED array portion, and FIG. 6C is a sectional view illustrating the LED array portion and a light guide plate to which a straight-line type diverter is attached at a position corresponding to the LED array portion.

Referring to FIGS. 6A to 6C, in the backlight unit for an LCD device, an LED array portion having a plurality of light emitting devices (LED) 321 with a certain gap distance are fixedly installed at an array supporter 315, and the array supporter 315 is coupled to a lower cover (not shown). A reflection sheet (not shown) formed of aluminum is provided between the LEDs 321. In a backlight unit using a light emitting device sensitive to heat, a metal core printed circuit board (MCPCB) is used as the array supporter (not shown) for heat emission, which differs from a backlight unit using a cold cathode fluorescent lamp (CCFL) and external electrode fluorescent lamps (EEFL).

A light guide plate 323 to which a straight-line type diverter 325 is attached is formed above the LED array portion having the plural LEDs 321. The straight-line type diverter 325 formed at a rear surface of the light guide plate 323 corresponds with the LED array portion having the plural LEDs 321.

Although not shown, a diffusion plate (not shown) and a plurality of optical sheets (not shown) are arranged on the light guide plate 323 to which the straight-line type diverter 325 is attached, and an LCD panel (not shown) is arranged on the plural optical sheets (not shown).

The straight-line type diverter shields an optical beam emitted from the direct type backlight unit in a vertical direction. The straight-line type diverter replacing the conventional circular diverter has a simplified structure and can be easily be produced in large quantities. As the area occupied by the straight-line type diverter increases, the amount of reflection also increases and thus the optical beam emitted from the backlight unit is more diffused.

In the illustrated structure, color mixing and uniformity are enhanced compared with the conventional structure, thereby enhancing the display quality of the LCD device. Furthermore, whereas a light guide plate of the prior art functions to maintain a uniform distance between the diverter and the light emitting device rather than to directly change the optical path, the straight-line type diverter supports the light emitting device at a predetermined height, thus a conventional light guide plate may not be required in the present invention. As the result, the optical loss generated when optical beam passes through the light guide plate is not incurred, and the display quality of the LCD device is enhanced, and brightness and mass-production capability are also enhanced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device including a backlight unit, the device comprising:
   a light emitting device (LED) array portion having a plurality of LEDs;
   an integral type diverter adjacent to the LED array portion and not supported by a light guide plate, and having a plurality of reflection surfaces in spaced relationship with each of the plurality of LEDs included in the LED array portion, and each of the reflection surfaces is disposed at a position corresponding to each of the plurality of LEDs, and the integral type diverter is disposed separately with the light emitting device array portion, wherein supporters are installed at the integral type diverter, and the supporters are installed between the adjacent reflective surfaces and at a side surface thereof;

a partition wall installed between the LED array portion and the integral type diverter; and a diffusion plate and an optical plate overlying the integral type diverter.

2. The backlight unit of claim 1, wherein the partition wall comprises an array defining a plurality of cells in which a number of LEDs are positioned in each cell.

3. The backlight unit of claim 1, wherein the integral type diverter is supported by the partition wall.

4. A backlight unit comprising:

a light emitting device (LED) array portion having a plurality of LEDs;

an integral type diverter disposed over the LED array portion and not supported by a light guide plate, and having a plurality of integral reflection surfaces comprising linearly arranged circular regions, each circular region at a position corresponding to an LED, wherein each LED has a light discharging portion, and wherein a diameter of each of the circular regions is equal to or greater than the light discharging portion of the LEDs, and the integral type diverter is disposed separately with the light emitting device array portion, wherein supporters are installed at the integral type diverter;

a plurality of pin-shaped supporters extending from the integral type diverter to the LED array portion;

a partition wall is installed between the LED array portion and the integral type diverter, wherein the integral type diverter is supported by the partition wall; and a diffusion plate and an optical plate overlying the integral type diverter.

5. The backlight unit of claim 4, wherein the integral type diverter is spaced apart from the LED array portion by a separation distance of about 0.01 to about 10 mm.

6. The backlight unit of claim 4, wherein the partition wall comprises an array defining a plurality of cells in which a number of LEDs are positioned in each cell.

7. A backlight unit comprising:

a light emitting diode (LED) array portion having a plurality of LEDs;

a diverter disposed over the LED array portion and not supported by a light guide plate, and having a linear reflection surface, wherein the linear reflection surface comprises a integral surface of the integral type diverter, and the integral type diverter is disposed separately with the light emitting device array portion, wherein supporters are installed at the integral type diverter;

a plurality of pin-shaped supporters extending from the integral type diverter to the LED array portion;

a partition wall installed between the integral type diverter and LED array portion, wherein the partition wall comprises an array defining a plurality of cells in which a number of LEDs are positioned in each cell, and the integral type diverter is supported by the partition wall; and a diffusion plate and an optical plate overlying the integral type diverter.

8. The backlight unit of claim 7, wherein the integral type diverter is spaced apart from the LED array portion by a separation distance of about 0 to about 10 mm.

9. A liquid crystal display (LCD) device having a backlight unit, the device comprising:

an LCD panel; and a light emitting device (LED) array portion having a plurality of LEDs;

an integral type diverter disposed on the LED array portion and not supported by a light guide plate, and having a plurality of integral reflection surfaces in spaced relationship with the LED array portion and having linearly arranged circular regions and each circular region at a position corresponding to an LED, wherein each of the reflection surfaces is disposed at a position corresponding to each of the plurality of LEDs, wherein each LED has a light discharging portion, and wherein a diameter of the circular regions is equal to or greater than the light discharging portion of the LEDs, and the integral type diverter is disposed separately with the light emitting device array portion, wherein supporters are installed at the integral type diverter;

a partition wall installed between the integral type diverter and LED array portion, wherein the integral type diverter is supported by the partition wall and the supporters, and wherein the partition wall comprises an array defining a plurality of cells in which a number of LEDs are positioned in each cell; and a diffusion plate and an optical plate overlying the integral type diverter.

10. The LCD device of claim 9, wherein the integral type diverter is spaced apart from the LED array portion by a separation distance of about 0.01 mm to about 10 mm.

11. The LCD device of claim 9, wherein the integral type diverter comprises a linear reflection surface disposed over the LED array portion.

12. The LCD device of claim 11, wherein the integral type diverter is spaced apart from the LED array portion by a separation distance of about 0.01 to about 10 mm.

* * * * *